United States Patent
Gehring et al.

(10) Patent No.: US 10,375,492 B2
(45) Date of Patent: Aug. 6, 2019

(54) METHOD OF FITTING A HEARING ASSISTANCE DEVICE

(71) Applicant: Sonova AG, Staefa (CH)

(72) Inventors: Stephan Gehring, Uerikon (CH); Roland Hug, Hinwil (CH); Amre El-Hoiydi, Neuchâtel (CH)

(73) Assignee: Sonova, AG, Stäfa (CH)

( * ) Notice: Subject to any disclaimer, the term of this patent is extended or adjusted under 35 U.S.C. 154(b) by 67 days.

(21) Appl. No.: 15/571,520

(22) PCT Filed: Jun. 30, 2015

(86) PCT No.: PCT/EP2015/064805
§ 371 (c)(1),
(2) Date: Nov. 3, 2017

(87) PCT Pub. No.: WO2015/132419
PCT Pub. Date: Sep. 11, 2015

(65) Prior Publication Data
US 2019/0132691 A1 May 2, 2019

(51) Int. Cl.
*H04R 25/00* (2006.01)
*H04W 76/14* (2018.01)

(52) U.S. Cl.
CPC .......... *H04R 25/70* (2013.01); *H04R 25/55* (2013.01); *H04R 25/554* (2013.01); *H04W 76/14* (2018.02)

(58) Field of Classification Search
CPC .... H04R 225/55; H04R 25/558; H04R 25/70; H04R 29/00; H04R 2225/41;
(Continued)

(56) References Cited

U.S. PATENT DOCUMENTS

| | | |
|---|---|---|
| 6,208,861 B1 | 3/2001 | Suzuki |
| 7,986,790 B2 | 7/2011 | Zhang et al. |

(Continued)

FOREIGN PATENT DOCUMENTS

| | | |
|---|---|---|
| EP | 2760225 A1 | 7/2014 |
| WO | WO02/073874 A2 | 9/2002 |

(Continued)

OTHER PUBLICATIONS

International Searching Authority, The International Search Report and Written Opinion of the International Searching Authority, pp. 1-10, Published Feb. 25, 2016, Published by WIPO.

*Primary Examiner* — Binh Kien Tieu (57) ABSTRACT

There is provided a method of fitting a hearing assistance device (10, 11) by using a fitting station (40), the hearing assistance device and the fitting station both having a wireless communication interface (20), comprising: generating, separately from the hearing assistance device and the fitting station, a production key, distributing the production key to both the fitting station and the hearing assistance device, and storing the production key on both the fitting station and the hearing assistance device; initiating, via the fitting station, a connection with the hearing assistance device, with the hearing assistance device accepting the connection in order to establish a non-encrypted connection between the fitting station and the hearing assistance device via the wireless communication interfaces; determining, by the fitting station, whether the fitting station has been previously paired with the hearing assistance device, and, if the fitting station has not already been paired with the hearing assistance device, using the production key in both the fitting station and the hearing assistance device as a shared secret in order to pair the fitting station and the hearing assistance device, thereby establishing a secure connection (30) via the wireless communication interfaces (Continued)

between the fitting station and the hearing assistance device; and conducting a fitting session via a secure connection between the fitting station and the hearing assistance device via the wireless communication interfaces.

17 Claims, 7 Drawing Sheets

(58) Field of Classification Search
CPC .. H04R 2460/07; H04R 25/55; H04R 25/554; G01F 15/0755; H04W 76/14
USPC .................................. 381/60, 312, 314, 315
See application file for complete search history.

(56) References Cited

U.S. PATENT DOCUMENTS

| | | | |
|---|---|---|---|
| 8,767,986 B1* | 7/2014 | Fabry | H04R 25/70 |
| | | | 381/314 |
| 9,439,008 B2 | 9/2016 | Shenib | |
| 9,439,009 B2 | 9/2016 | Kim | |
| 2012/0140962 A1* | 6/2012 | Ubezio | H04R 25/558 |
| | | | 381/314 |
| 2014/0211972 A1* | 7/2014 | Kim | H04R 25/70 |
| | | | 381/314 |
| 2015/0163585 A1* | 6/2015 | Sohn | H04R 25/554 |
| | | | 381/74 |
| 2019/0110140 A1* | 4/2019 | Dickmann | H04R 25/55 |

FOREIGN PATENT DOCUMENTS

| WO | WO2014/114819 A2 | 7/2014 |
|---|---|---|
| WO | WO2015/001135 A2 | 1/2015 |

* cited by examiner

METHOD OF FITTING A HEARING ASSISTANCE DEVICE

The invention relates to a method of fitting a hearing assistance device, such as a hearing aid, by using a fitting station, wherein the hearing assistance device and the fitting station communicate via a wireless communication interface, such as a Bluetooth interface.

Typically, during a fitting session, a fitting station, which may be a PC or tablet computer on which a specific fitting software is running, is connected to the hearing assistance device via a wireless communication interface in order to adjust the hearing assistance device to the individual needs of a user or patient, such as to the individual hearing loss. The wireless interface may utilize a proprietary protocol, or it may use a standard protocol, such as a Bluetooth protocol. For safety reasons, it is desirable that the communication between the fitting station and the hearing assistance device is encrypted, i.e. the exchanged data is encoded using a key, and that the fitting station and the hearing assistance device only communicate with authenticated devices.

For example, when connecting two devices using Bluetooth technology for the first time, the two devices to be paired must be brought into a pairable mode which requires to perform a pairing gesture, such as entering a PIN, on both devices. However, since an ear level hearing device is a relatively small device with a very limited user interface, for example small buttons which are difficult to handle, it is not desirable to be requested to perform a fitting gesture on the hearing assistance device for pairing with the fitting station.

On the other hand, allowing the hearing device to be continuously and promiscuously pairable would pose a significant security risk in that any Bluetooth device could pair with the hearing assistance device, be it at the hearing care provider's office or at a bus station; for example, by pairing a smartphone with the hearing assistance device in order to control the patient's hearing assistance devices without authorization.

US 2011/0221590 A1 relates to a method for automatically adding a first sensor device disposed on a patient's body to a personal area network in a healthcare application, wherein the network is based on Bluetooth communication, with out-of-band pairing data being injected into the patient's body by a second sensor device disposed on the patient's body; pairing data extracted from the signal received at the first sensor device is used to add the first sensor device to the network.

WO 2014/154151 A1 relates to an out-of-band pairing process of two Bluetooth devices, wherein an audio channel is used as an out-of-band medium for exchanging Bluetooth pairing information.

WO 2014/158365 A1 relates to a method for pairing a first and a second device, wherein a third device acting as a pairing apparatus is used to obtain the address of the second device in order to provide it to the first device, and wherein the third device initiates removal of an input and output capability in at least one of the first and second device in order to force a particular pairing mode.

GB 2512502 A relates to a method for authentication of a new device to a mesh network based on the Bluetooth Low Energy protocol, wherein a first message containing an identifier for a new device as well as an authorization code is received by a second device by analyzing an image, such as a QR code, and wherein the new device sends a second message to the second device allowing the second device to authenticate the new device by comparing the authorization code with the processed information sent by the new device.

WO 2003/056746 A1 relates to a method of mutual pairing of a plurality of Bluetooth devices by transmitting a link key obtained by pairing of a first device with a second device from the second device to a third device for enabling automatic pairing of the first device with the third device; thus, the link key may be used as a common group key by all devices of the group for establishing a secure connection without the need for manual pairing.

U.S. Pat. No. 8,555,063 B2 relates to a method for establishing a wireless link key between a remote device and a group device, wherein a group identifier is transmitted which is then used by the recipient device to determine whether the sender device is a member of the same trusted group and to establish a secure link or pair with the sender device, depending on the result of the determination.

It is an object of the invention to provide for a method of fitting a hearing assistance device by a fitting station, wherein a secure wireless communication link can be established without the need for manipulation of the hearing assistance device.

According to the invention, this object is achieved by a fitting method as defined in claim 1.

The invention is beneficial in that by using a production key which is distributed out-of-band both to the fitting station and the hearing assistance device and by using the production key in both the fitting station and the hearing assistance device as a shared secret in order to pair the fitting station and the hearing assistance device, a so called "secure connection" can be established between the fitting station and the hearing assistance device without the need for performing a pairing gesture on the hearing assistance device. A "secure connection" as used hereinafter is a connection over which data is exchanged that is encrypted using a shared key or wherein a shared key is used to authenticate (typically non-encrypted) data exchanged via the connection, i.e. the receiver of a message can verify that the message was sent by an authorized party.

Preferably, the production key is implemented in the hearing assistance device already upon manufacturing of the hearing assistance device.

Preferably, the wireless communication interfaces are adapted to use a Bluetooth protocol, such as Bluetooth Low Energy.

According to one embodiment, the fitting station requests, for pairing the fitting station and the hearing assistance device, the Bluetooth "Secure Simple Pairing" mechanism with "Passkey Entry" association model, wherein the production key is used as the passkey by both the fitting station and the hearing assistance device. According to an alternative embodiment, the "Secure Connections" mechanism of Bluetooth version 4.2 may be used for pairing the fitting station and the hearing assistance device.

According to an alternative embodiment, the fitting station and the hearing assistance device mutually authenticate each other by using the production key, wherein, after mutual authentication, the fitting station requests Bluetooth "Just Works" pairing with the hearing assistance device in order to pair the fitting station with the hearing assistance device.

Preferably, after pairing a new user key is generated by action of at least one of the fitting station and the hearing assistance device, after which this new user key is distributed to both the fitting station and the hearing assistance device via the link secured using the production key. The new user key is then used as a new long-term key for establishing a secure connection during the fitting session. In other words, the production key is only used for establishing a secure connection for exchanging a new user key which then is used as a long-term key for securing subsequent communication between the fitting station and the hearing assistance device during the fitting session.

Typically, the hearing assistance device is an ear level device, such as a hearing aid, a cochlea implant device or a wireless headphone. Hearing assistance devices include so called "personal sound amplification devices" (PSAPs) as well.

Further preferred embodiments are defined in the dependent claims.

Hereinafter, examples with the invention will be illustrated by reference to the attached drawings, wherein.

Figure 1:
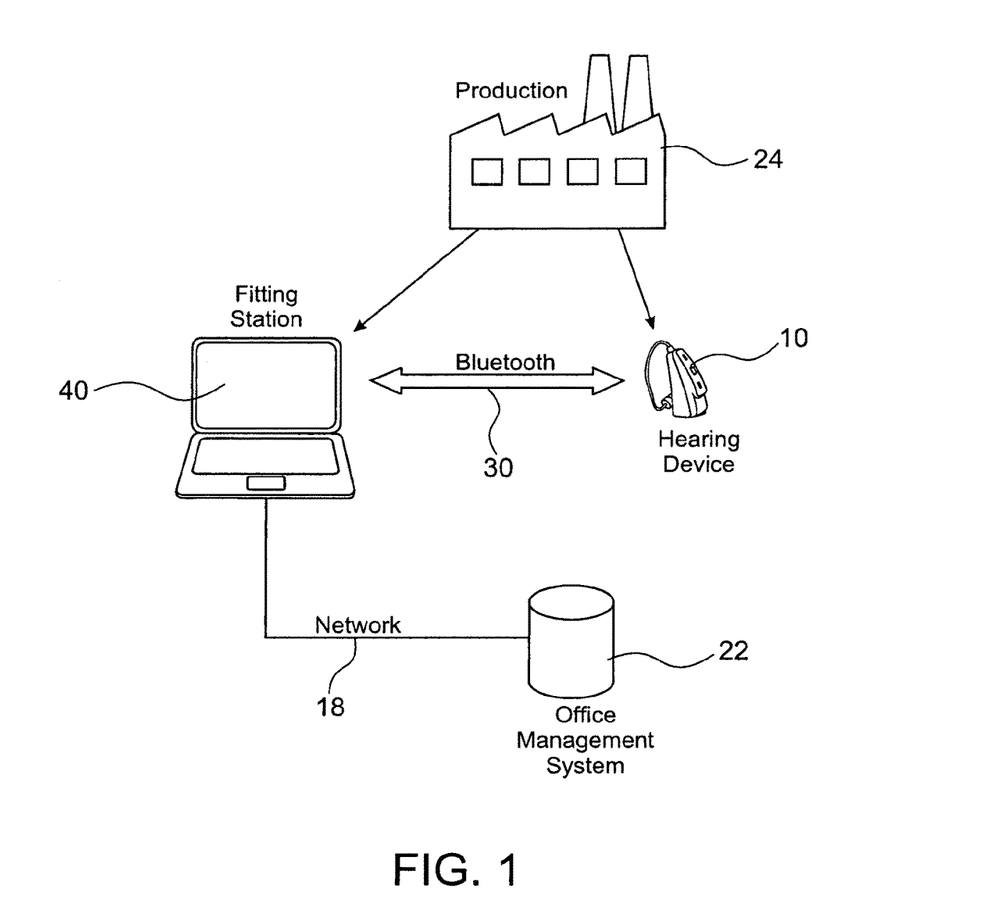
FIG. 1 is a schematic representation of a first example of a system for fitting a hearing assistance device.

FIG. 1 is a schematic illustration of an example of a system for conducting a fitting method according to the invention, comprising a fitting station 40 and a hearing assistance device 10 which may connect with each other via a Bluetooth link 30. The fitting station 40 typically is a computer device, such as a PC or a tablet computer, on which a specific fitting software is run and which is connected via a network 18 with an office management system which includes a patient database 22. The system further comprises a production facility 24 which serves to produce and pre-configure the fitting software running on the fitting station 40 and the hearing assistance device 10. The fitting station 40 is able to communicate with the hearing device 10 via a Bluetooth link 30 for conducting a fitting session in order to individually adjust the hearing assistance device 10 to the individual preferences and needs of the user of the hearing assistance device 10. Such fitting session may include feedback from the user while wearing the hearing assistance device 10.

Figure 2:
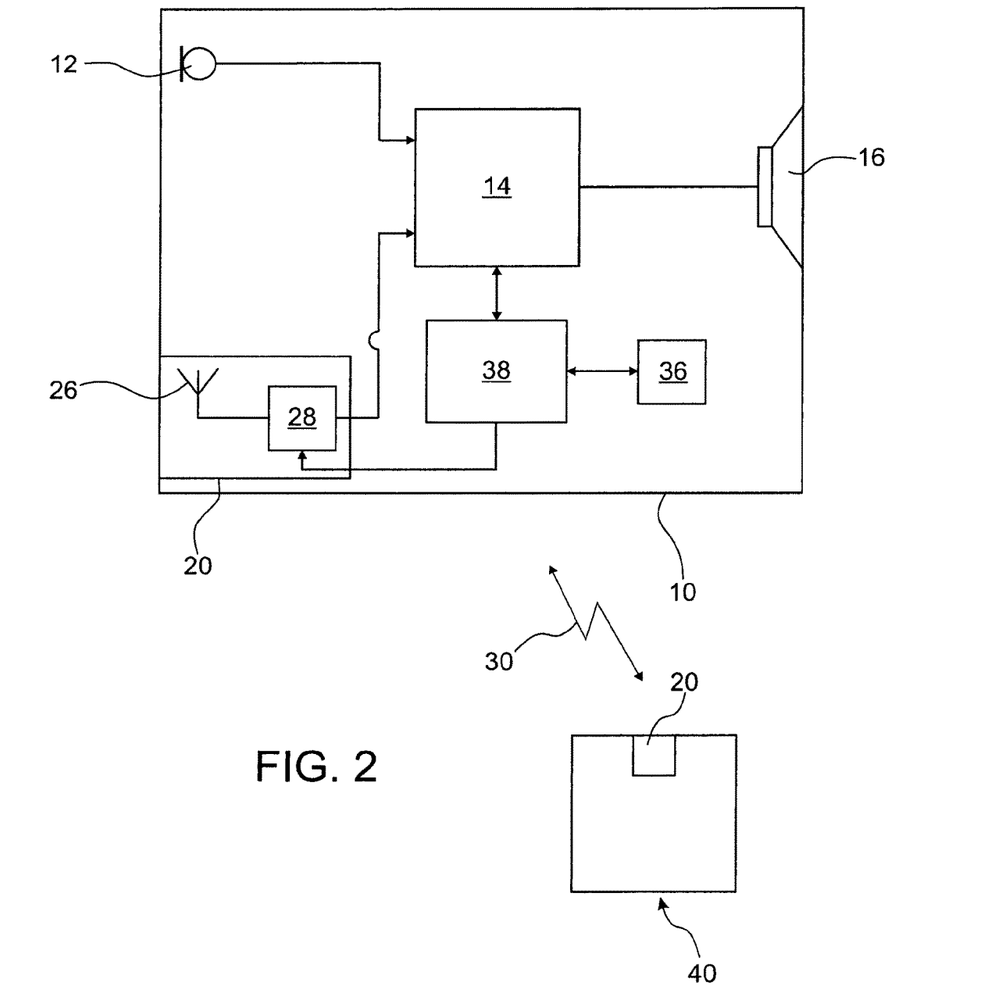
FIG. 2 is an example of a schematic block diagram of components of the system of FIG. 1.

An example of a block diagram of the fitting station 40 and the hearing assistance device 10 is shown in FIG. 2.

In the example of FIG. 2, the hearing assistance device 10 is a hearing aid comprising a microphone arrangement 12 for capturing audio signals from ambient sound, an audio signal processing unit 14 for processing the captured audio signals and an electro-acoustic output transducer (loudspeaker) 16 for stimulation the user's hearing according to the processed audio signals.

The hearing aid 10 also comprises a wireless interface 20 comprising an antenna 26 and a transceiver 28.

The interface 20 is provided for enabling wireless data exchange between the first hearing aid 10 and other devices, such as a second hearing aid of a binaural system, an audio streaming device, or a remote microphone, via a wireless link.

The interface 20 is also provided for data exchange via a wireless link 30 with a fitting station comprising a wireless interface 20.

For example, the interface 20 may be adapted to operate in a frequency range of 0.38 GHz to 5.825 GHz, preferably at frequencies around 2.4 GHz in the ISM band. Typically, the interface 20 is a Bluetooth interface; alternatively, it may use another standard protocol or proprietary protocol.

The hearing aid 10 also comprise a controller 38 for controlling operation of the hearing aid 10, with the controller 38 acting on the signal processing unit 14 and the transceiver 28, and a memory 36 for storing data required for operation of the hearing aid 10 and data required for operation of the interface 20, such as pairing/network data.

The first hearing assistance device typically is an ear level device and preferably forms part of a binaural hearing system. For example, the hearing assistance device may be a hearing aid, such as a BTE (behind the ear), ITE (in the ear) or CIC (completely in the channel) hearing aid, or an auditory prosthesis, such as a cochlear implant. Alternatively, the hearing assistance device may be a wireless headphone which requires or enables fitting in the sense of individual adjustment.

Before a fitting session with the hearing assistance device 10 can be performed, it is necessary to pair the fitting station 40 with the hearing assistance device 10. In order to minimize the manual interaction required for the pairing procedure, while nevertheless providing for a secure communication link and avoiding promiscuous pairing of the hearing assistance device 10, both the fitting station 40 and the hearing assistance device 10 are provided with the same production key prior to any pairing action, where the production key is used as a shared secret for pairing the fitting station 40 and the hearing assistance device 10. For example, the hearing assistance device could be configured to only pair with a device with the right production key, and only when the hearing assistance device is fresh out of the box. Alternatively, gesture-less pairing may work only for devices with the right production key, but for others, pairing may be allowed by gesture. Another example is to allow multiple production keys and allow gesture-less pairing with any device that knows one of the production keys.

The production key typically is generated at the production facility 24, i.e. separately from the hearing assistance device 10 and the fitting station 40, and then is distributed to both the fitting station 40 and the hearing assistance device 10 for being persistently stored by both the fitting station 40 and the hearing assistance device 10. Preferably, the production key is provided to the hearing assistance device 10 upon manufacturing at the production facility 24. The production key may be distributed to the fitting station 40 as part of a software package which is to be run on the fitting station 40; in this case the production key is associated with the fitting software during production of the software. Alternatively, the production key may be provided to the fitting station 40 separately from the distribution of the fitting software in order to at least slightly increase the degree of security in case of pirating of the fitting software; for example, the production key may be distributed to the fitting station 40 via a communication network, such as the internet, or on a data carrier, such as a CD.

Preferably, the same production key may be used for a plurality of hearing assistance devices of the manufacturer, since in this case the fitting station/fitting software does not have to be provided with (and does not have to store) a separate production key for each hearing assistance device.

Alternatively, a separate production key may be used for each brand of the manufacturer.

When the hearing care professional starts a fitting session with the hearing assistance device 10 for the first time, the production key is available as a shared secret both in the fitting session 40 and the hearing assistance device 10. For starting the fitting session, the fitting software is started on the fitting station 40 and a new fitting session is created for the patient using the hearing assistance device 10. The hearing care provider then directs the fitting station 40 to connect to the hearing assistance device 10, for example by pressing a "connect" button in the fitting software, whereupon the fitting software searches for hearing devices within range and presents them to the hearing care provider for selection (the fitting station 40, together with the fitting software, provides for an appropriate graphical user interface). The hearing care provider then selects the desired hearing assistance device 10, whereupon the fitting software initiates a connection with the hearing assistance device 10.

The search for hearing assistance devices within a range of the fitting station 40 may be performed by the fitting software as a regular Bluetooth device discovery as specified in the Bluetooth standard, wherein a filter may be applied to present only hearing assistance devices of a desired brand, e.g. by applying a filter based on the MAC address of the hearing assistance device 10.

In order to initiate a connection to the hearing assistance device 10, the fitting software creates an unsecure, i.e. open/non-key protected, Bluetooth connection to the selected hearing assistance device 10, with the hearing assistance device accepting the connection. The fitting software then determines, for example by a look-up in the patient database 22 of the office management system, whether the fitting station 40 already has been paired with the hearing assistance device 10 or not. If the fitting software and the hearing assistance device 10 determine that the fitting station 40 has not already previously been paired with the hearing assistance device 10, the production key is used in both the fitting station 40 and the hearing assistance device as a shared secret in order to pair the fitting station 40 and the hearing assistance device 10, whereby a secure connection is established between the fitting station 40 and the hearing assistance device 10. Once such secure Bluetooth connection has been established, a fitting session may be conducted using the secure connection.

According to one embodiment, the fitting software, for achieving pairing with the hearing assistance device 10, requests the Bluetooth "Secure Simple Pairing" mechanism with "Passkey Entry" association model, wherein the production key is used by the fitting software and the hearing assistance device 10 as the passkey in the Passkey Entry association model. More in detail, the fitting software first uses the production key as input to the pairing algorithm of the Secure Simple Pairing" mechanism, and the hearing assistance device 10, due to its knowledge of the production key, determines that the pairing request comes from an authorized fitting software, accepts the request and uses its current user key, namely the production key, as the passkey. Since the fitting software and the hearing assistance device 10 thus use the same key, pairing will succeed and the fitting station 40 and the hearing assistance device 10 are paired. The fitting software now creates a secure link with the hearing assistance device 10 using security information derived during the pairing process, i.e. the current user key, namely the production key, is used as a key for protecting the link 30.

The fitting software then generates a new user key, which may be a random key, and transmits the new user key via the link 30 protected by the production key to the hearing assistance device 10. The hearing assistance device 10 then persistently stores the received new user key as its current user key, with the new user key then being used as a basis for protecting the link 30 during the fitting session (in practice, the new user key is used generate a temporary session key which the is used as the actual key for protecting the link during the fitting session). Finally, the fitting software persistently stores the new user key, together with patient data and other hearing assistance device data, in the patient database 22 of the office management system. Thus, this new user key is used as a long-term key for the paired devices.

As an alternative to the generation of the new user key by the fitting software alone, the new user key may be generated by a cooperation of the fitting software and the hearing assistance device 10 to prevent the new user key from being transmitted between the devices or by the hearing assistance device 10 alone (in the latter case, the new user key would be transmitted from the hearing assistance device 10 via the link 30 protected via the production key to the fitting station 40).

According to this pairing procedure, the production key preferably is used only once (according to an alternative—though not preferred—embodiment the production key can always be used, which allows for other fitting stations with the production key to be also paired with the hearing device without gesture on the device) as a temporary ("short-term") key for establishing a secure link which then can be used to securely distribute a new user key generated by the fitting software and/or the hearing assistance device to the respective other device; the new user key then replaces the production key as the key used for protecting the link 30 between the fitting station 40 and the hearing assistance device 10, and the new user key is stored both by the hearing assistance device 10 and the fitting station 40 for use in the present fitting session and in future fitting sessions (as already mentioned, the new user key then serves as a basis for generating a temporary session key for each fitting session). Thus, in summary, the production key serves as input to a process for generating a Bluetooth long-term key, from which the respective temporary session key is derived.

In other words, the new user key may be used to bond the fitting station 40 and the hearing assistance device 10, so that the pairing procedure does not have to be repeated in future fitting sessions. By using the production key only for the very first pairing of the hearing assistance device 10 and the fitting station 40, the security of the pairing procedure is enhanced, since even if the production key is leaked, the security of hearing assistance devices already having been paired will not be compromised (an external Bluetooth device trying to pair with the hearing assistance device 10 by using the production key would not be successful once a hearing assistance device 10 has been paired once with the fitting station 40).

According to one example, the hearing assistance device 10 may be adapted to be reset to factory settings, so that the production key will be re-used for future pairing procedures with the fitting station 40 (or other devices provided with the production key), i.e. by resetting the hearing assistance device the current user key is set to the production key, rather than to the new user key described above.

Further, the fitting software and the hearing assistance device 10 may be designed such that if an attempt to reestablish the secure link using the new user key fails, the production key is re-used in both the fitting software and the hearing assistance device 10 as a shared secret in order to pair the fitting station 40 and the hearing assistance device 10 as described above. This may happen, for example, when the hearing assistance device, which may have limited persistent memory, removes the stored new user key for some reason.

Figure 3A:
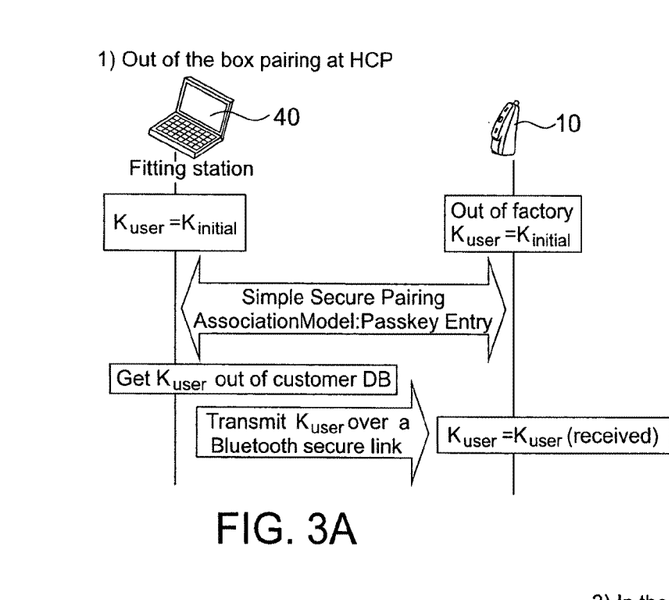
FIGS. 3A to 3C are schematic illustrations of an example of a pairing process between a fitting station and a hearing assistance device, with subsequent pairing of the fitting station with another hearing assistance device and subsequent pairing of the two hearing assistance devices.

A schematic flow diagram of the pairing procedure described above is shown in FIG. 3A.

Figure 3B:
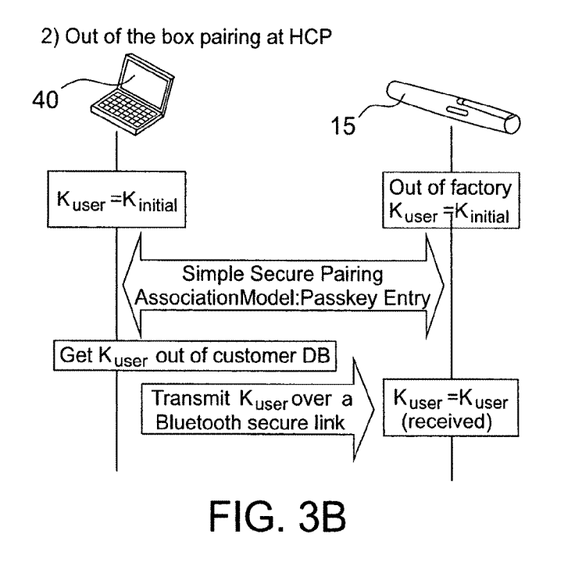

Another pairing example is shown in FIG. 3B, wherein a remote microphone 15, rather than a hearing assistance device 10, is paired with the fitting station 40.

Figure 3C:
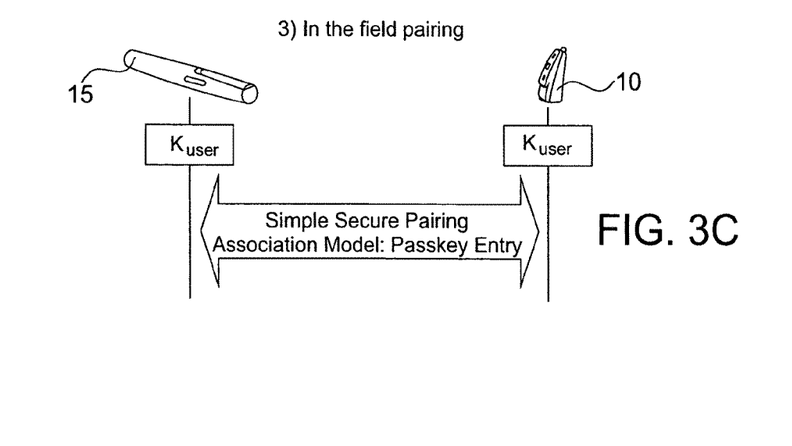

FIG. 3C shows an example of a pairing process between the remote microphone 15 and the hearing aid 10, with both devices 10, 15 previously having been paired with the fitting station 40. In case that the fitting station 40 has generated the same new user key in this pairing process, the current user key of the hearing aid 10 and the remote microphone 15 is the same, namely it is the new user key generated by the fitting station 40. In this case, the devices 10, 15 may pair with each other by using the Bluetooth "Simple Secure Pairing" mechanism with the "Passkey Entry" association model, without a need for manual action.

According to an alternative embodiment, the pairing according to the "Secure Simple Pairing" mechanism as described above may be replaced by a "Just Works" pairing after mutual authentication using the production key as a shared secret. More in detail, once the fitting software has determined that it has not been paired before with the hearing assistance device 10, the fitting software authenticates the hearing assistance device 10 using the fitting software's current user key, namely the production key ("authentication" means that the fitting software digitally signs a message using the key and sends the message along with the signature to the other device, which then performs the same procedure and finally compares the locally generated signature with the received signature). If authentication of the hearing assistance device 10 fails, the fitting software aborts the pairing procedure. If authentication is successful, the hearing assistance device 10 then authenticates the fitting software using the current user key of the hearing assistance device 10, namely the production key. If authentication of the fitting software fails, the hearing assistance device 10 aborts the pairing procedure. Once mutual authentication of the two devices 10, 40 is successful, the fitting software requests Bluetooth "Just Works" pairing with the hearing assistance device 10; due to the mutual authentication, the two devices trust each other to perform a "Just Works" pairing (and would not accept a "Just Works" pairing with any other device), so that the "Just Works" pairing succeeds and the fitting software and the hearing assistance device 10 are paired.

The further procedure is like in the "Secure Simple Pairing" example described above, i.e. the secure link established by using the production key is used for securely exchanging a new user key which then is used as a basis for the session key protecting the link during the fitting session.

Figure 4:
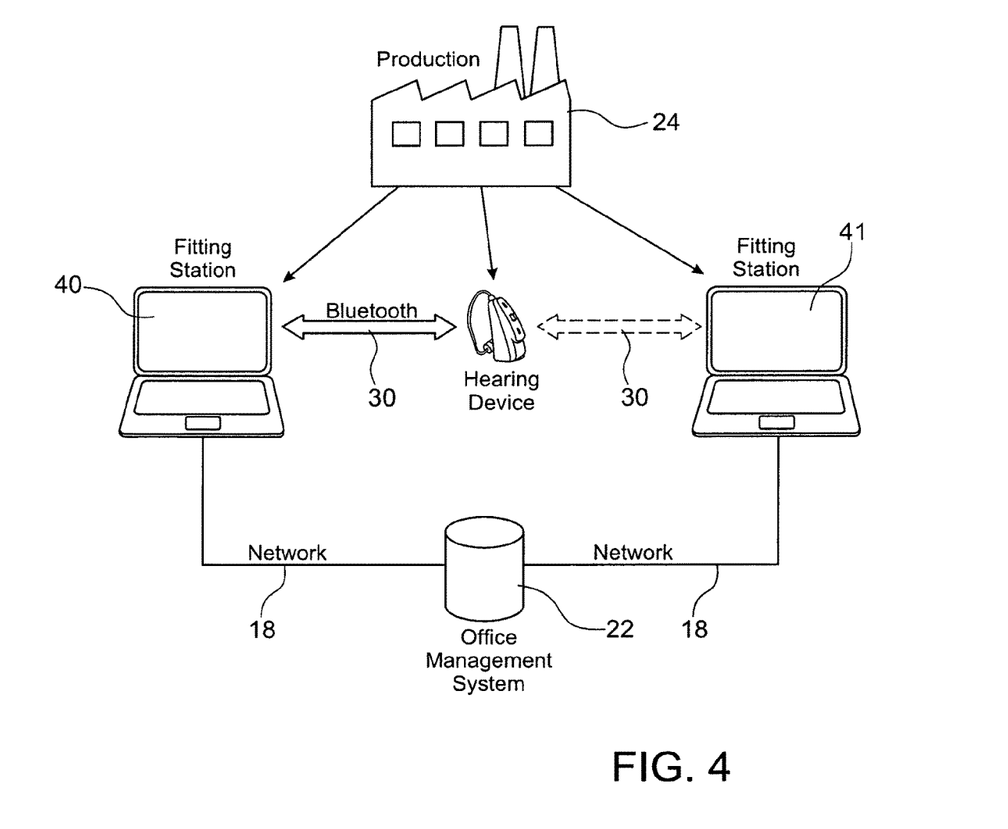
FIG. 4 is an illustration like FIG. 1, wherein the system comprises two fitting stations.

In FIG. 4 a variant of the example shown in FIG. 1 is illustrated, wherein the hearing assistance device 10 may communicate with several fitting stations, with a second fitting station being indicated in FIG. 4 at 41. Such situation may occur in larger offices of a hearing care provider or with a hearing care provider running several offices. The fitting stations 40, 41 are connected to the same office management system (database 22) via the network connection 18. A typical situation for such systems comprising a plurality of fitting stations 40, 41 is that the first fitting session is performed via a first fitting station 40, and a later second fitting session is performed via a second fitting station 41 in the same office or in a different office, with the same hearing assistance device 10 being involved.

According to one embodiment, the new user key generated during the first pairing process of the first fitting station 40 with the hearing assistance device 10 is stored in the patient database 22 maintained by the office management system, as already mentioned above. The second fitting station 41, when pairing with the hearing assistance device 10 for performing a subsequent fitting session, may retrieve the new user key from the database 22, so that it may pair with the hearing assistance device 10 without need for further manual action of the hearing care provider once the hearing assistance device 10 has been selected as the desired device on the second fitting station 41. In this case, the new user key generated during the first pairing of the hearing assistance device 10 with the first fitting station 40 would be used as some kind of "group user key" which may be used by several fitting stations. Such use of a group user key would provide for a particularly fast connection setup for fitting sessions utilizing a second fitting station.

However, it also may be preferable, for the reasons explained below, to use only non-persistent storage of pairing information in the connection between the hearing assistance device 10 and the respective fitting station via the Bluetooth link 30. In such case, the new user key generated during the pairing procedure is not permanently stored by the hearing assistance device 10 and the fitting station, i.e. the new user key is used as a basis for the session key only during present fitting session, but it is not available for the next fitting session, so that for each fitting session the entire pairing process, including use of the production key as a shared secret for establishing a secure link which may be used for exchanging the new user key, has to be repeated (as already mentioned above, the production key and the (new) user key serve to authenticate the devices and to generate a pairing key, which pairing key is then used to create a session key, which is the actual key used to encrypt/secure the link during a fitting session). This may cause a delay compared to the case in which a persistently paired (i.e. bonded) pair consisting of a certain fitting station and a certain hearing assistance device is connected.

One reason for not storing the new user key persistently may be the typically limited persistent memory of hearing assistance devices. Further, the situation concerning the persistent storage of pairing information may be even more precarious for the fitting station/fitting software: while a hearing assistance device may only pair with a few fitting stations, a fitting station is likely to pair with hundreds of hearing assistance devices, which pairing information may "pollute" the fitting station's memory and cause performance bottlenecks; consequently, non-persistent pairing may be beneficial for the fitting station as well.

In this case, the production key is stored persistently in the patient database, but the actual pairing key is only temporarily stored in the fitting station memory for the duration of the fitting session.

As already mentioned above, the new user key generated during the first pairing procedure may be unique for each hearing assistance device.

Figure 5:
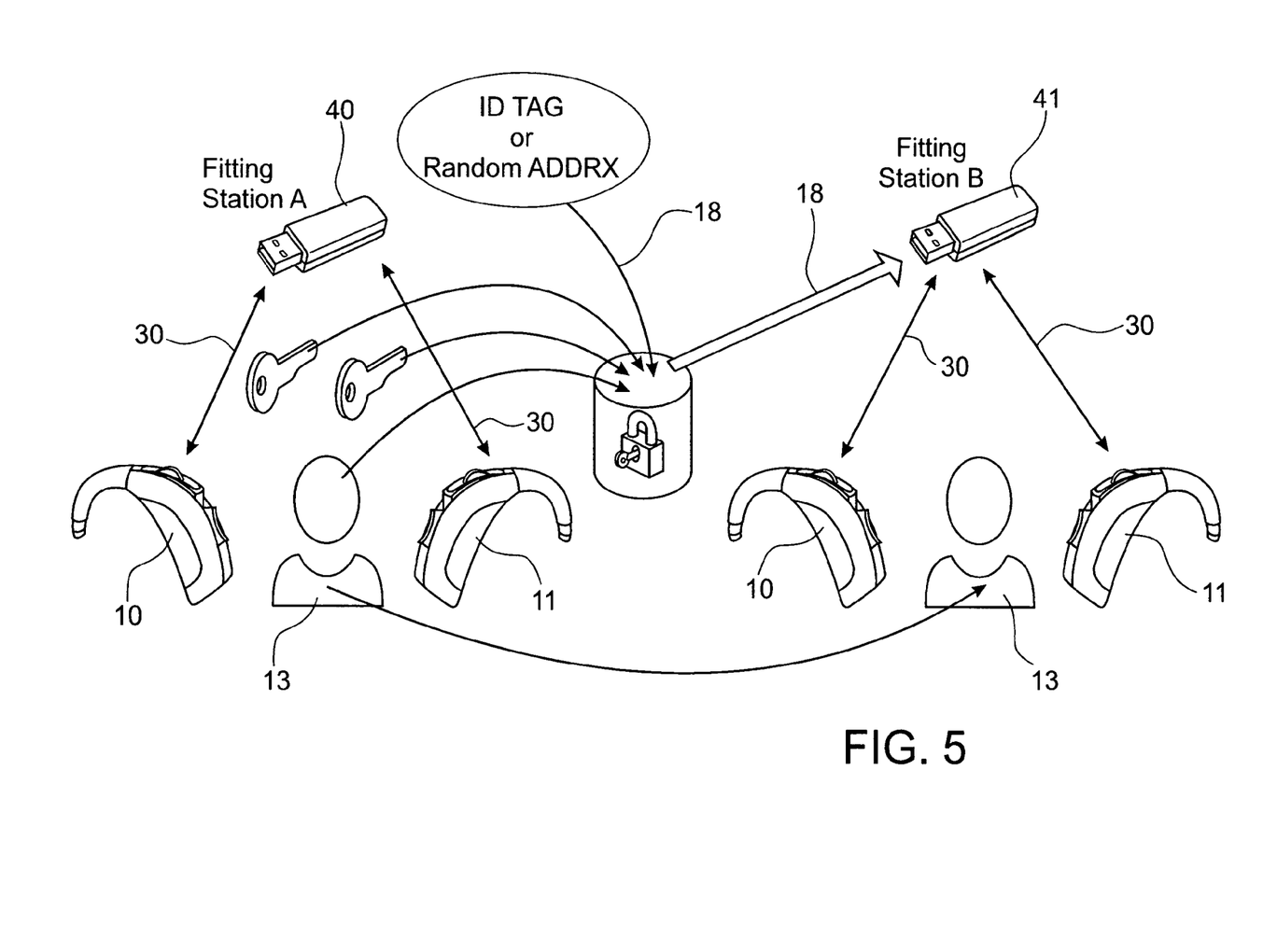
FIG. 5 is a schematic illustration of a variant of the example of FIG. 4.

FIG. 5 is a schematic illustration of a system comprising a plurality of fitting stations, similar to the system of FIG. 4, wherein the same new user key is used by each of the associated fitting stations when communicating with the same one (e.g. a first one) of a plurality of hearing assistance devices 10, 11 to be used by the same user 13; when communicating with another one (e.g. a second one) of the hearing assistance devices 10, 11, each of the associated fitting stations uses the same new user key (pairing key), which, however, may be different from the new user key used for communication with the first one of the hearing assistance devices (in other words, a first key X may be used by the fitting stations for communicating with the first hearing assistance device, and a second key Y may be used by the fitting stations for communicating with the second hearing assistance device). In the example of FIG. 5, the first hearing aid 10 may be paired with the first fitting station 40 in the manner described with regard to FIG. 4, i.e. pairing data including the new user key is generated and stored by the first fitting station 40 and the first hearing aid 10. This new user key (or, more precisely, a session key derived from the new user key) is used for establishing a secure link 30 between the first fitting station 40 and the first hearing aid 10 for performing a fitting session. Such pairing data also includes device IDs. Further, the first fitting station may generate an identity tag and may associate the identity tag with the pairing data; the identity tag and the pairing data may be stored both by the first hearing aid 10 and the first fitting station 40.

This pairing procedure similarly applies to the second hearing aid 11, wherein, the new user key generated during pairing of the second hearing aid 11 with the fitting station 40 may be different from new user key generated during pairing of the first hearing aid 10 with the fitting station 40; according to an alternative embodiment, the same new user key may be used also for the second hearing aid 11.

The identity tag and the pairing data then may be transferred to the second fitting station 41 for being used (as a basis for deriving a session key) in a later fitting session wherein the second fitting station 41 is automatically paired with the first and second hearing aid 10, 11 based on the identity tag and the associated pairing data received from the first fitting station 40, so that the new user key (or new user keys) generated at the beginning of the first fitting session is (are) used for establishing a secure link 30 between the second fitting station 41 and the hearing aid 10, 11 in a later fitting session (namely as a basis for the deriving a session key).

According to one embodiment, the identity tag may be a static random Bluetooth address used by the first fitting station 40 at the time of the pairing with the first hearing aid 10, wherein the second fitting station 41 adopts the identity tag as its Bluetooth address.

According to another embodiment, the second fitting station 41 communicates the identity tag to the hearing aids 10, 11, wherein the hearing aids 10, 11 and the second fitting station 41 retrieve the pairing data associated with the identity tag. In the first embodiment, the hearing aid 10, 11 will not be able to distinguish the second fitting station 41 from the first fitting station 40 and will be able to communicate with the second fitting station 41 in the same manner as with the first fitting station 40. In the second embodiment, the hearing aid 10, 11 will be able to associate the pairing information obtained from the initial pairing with the first fitting station 40 and, as a result, will be enabled to communicate with the second fitting station 41 via a secure link.

In all embodiments, the Bluetooth technology to be used may be Bluetooth Low Energy. When using a static random address according to the Bluetooth Low Energy specification, the Bluetooth stack may be reset prior to the assignment of a new random address.

The fitting stations may be assigned a new random address every time pairing with hearing assistance devices associated with a different patient 13 is performed.

Figure 6:
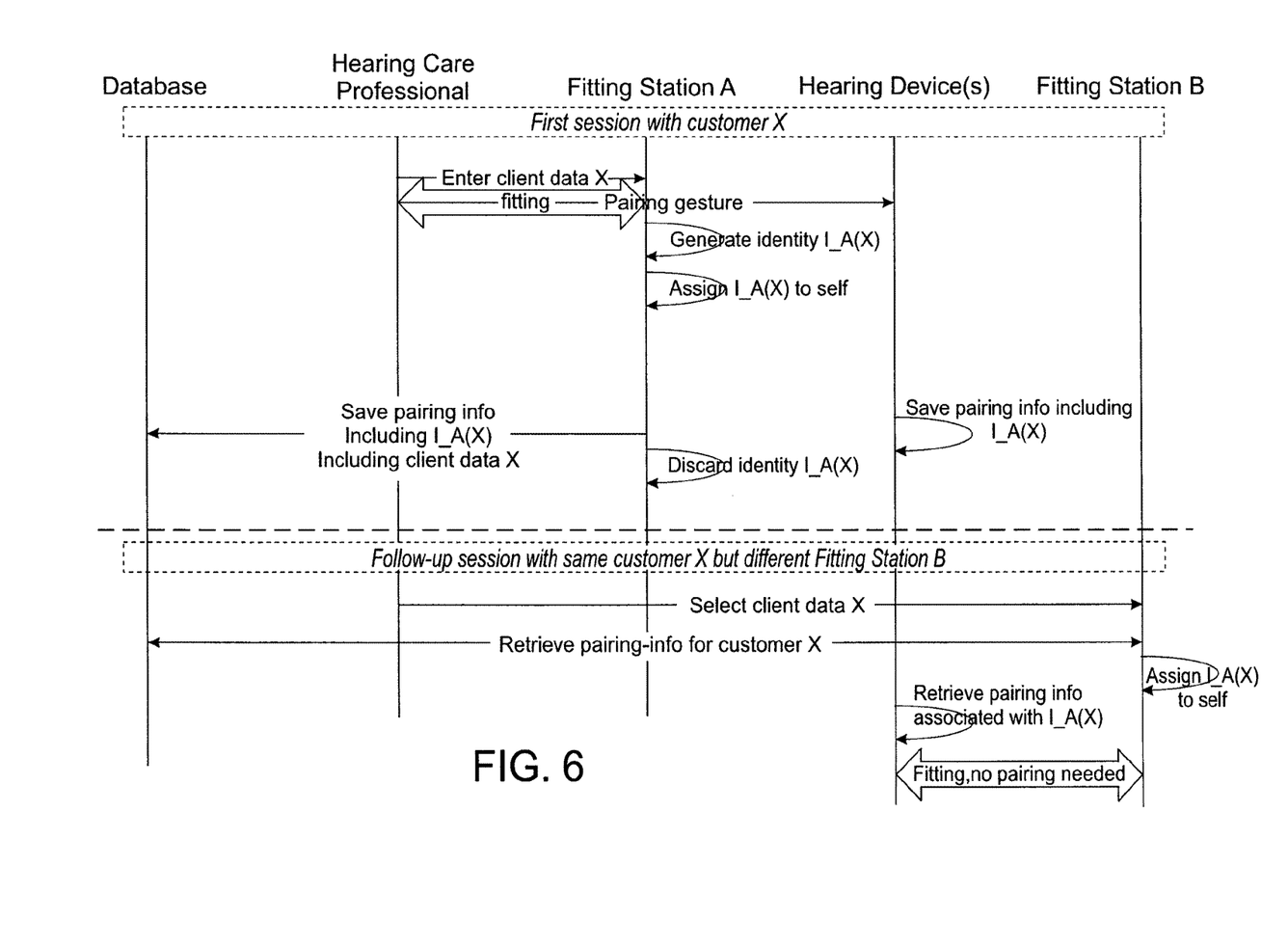
FIG. 6 is a flow diagram of an example of pairing processes of the system of FIG. 5.
Figure 7:
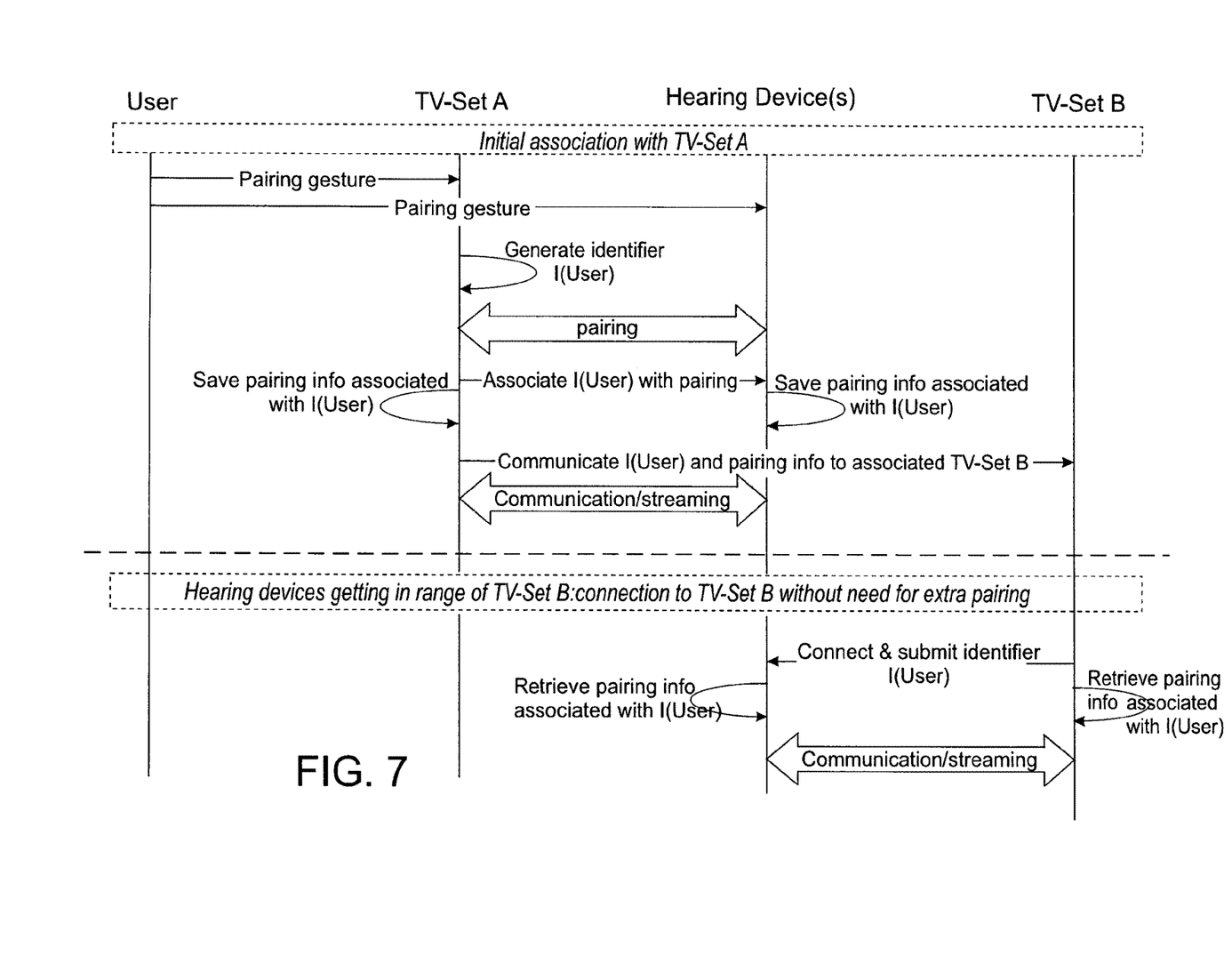
FIG. 7 is a flow diagram of another example of a pairing processes which, however, does not form part of the invention.

An example of a flowchart of the first embodiment, wherein a static random address is used as the identity tag, is illustrated in FIG. 6, and an example of a flow diagram of the second embodiment, wherein the identity tag is communicated to the hearing aid, is illustrated in FIG. 7.

Preferably, the identity tag and the pairing data is transferred from the first fitting station 40 to the second fitting station 41 via a database 22 of the office management system, i.e. the identity tag and the pairing data is stored by the first fitting station 40 in the database 22 and the second fitting station 41 is connected to the database in order to retrieve the identity tag and the pairing data from the database. Such database 22 may be implemented on a single, stand-alone memory device, or it may be implemented as a cloud distributed on a plurality of memory devices.

Alternatively, a network connection may be established between the first fitting station 40 and the second fitting station 41, and the identity tag and the pairing data may be transmitted from the first fitting station 40 to the second fitting station 41 via the network connection (rather than storing it on a central database).

According to another embodiment, a portable storage device may be used for transferring the identity tag and the pairing data; in this case, the first fitting station 40 would be connected to said portable storage device in order to transfer the data to the portable storage device, then the portable storage device will be moved to the second fitting station 41 and connected to the second fitting station 41 in order to transfer the data from the portable storage device to the second fitting station 41.

According to one example, which is not part of the present invention, the first pairing process, i.e. the first pairing between the first fitting station 40 and the first hearing aid 10 may be a conventional Bluetooth pairing process, without using a pre-stored production key in the first fitting station 40 and the first hearing aid 10; such conventional Bluetooth pairing process may require interaction of the hearing care provider with the first fitting station 40 or the first fitting station 40 and the first hearing aid 10.

According to another example, which likewise is not part of the present invention, the concept of transferring pairing information obtained by pairing of a hearing assistance device with a first external device, such as a first fitting station, to a second external device, such as a second fitting station for enabling automatic pairing of the hearing assistance device with the second external device may be applied also to non-fitting devices. For example, at least one of the external devices may be an audio source for providing an audio stream to the hearing assistance device. According to another example, at least one of the external devices may be an audio communication device, such as a mobile phone, a landline phone or an internet phone device. According to a still further example, at least one of the external devices may be a TV set, a personal computer, a tablet computer, a radio device or a media player (in the example of FIG. 7, the first and second external devices are TV-sets A and B). According to another example, at least one of the external devices may be an accessory device of a hearing device, such as a wireless microphone, a remote control or an audio streamer device.

The invention claimed is:

1. A method of fitting a hearing assistance device by using a fitting station, the hearing assistance device and the fitting station both having a wireless communication interface, comprising:
   generating, separately from the hearing assistance device and the fitting station, a production key;
   distributing the production key to both the fitting station and the hearing assistance device out-of-band, and storing the production key on both the fitting station and the hearing assistance device;
   initiating, via the fitting station, a connection with the hearing assistance device, with the hearing assistance device accepting the connection to establish a non-encrypted connection between the fitting station and the hearing assistance device via the wireless communication interfaces;
   determining, by the fitting station, whether the fitting station has been previously paired with the hearing assistance device, and using the production key in both the fitting station and the hearing assistance device as a shared secret to pair the fitting station and the hearing assistance device,
   establishing a secure connection via the wireless communication interfaces between the fitting station and the hearing assistance device, wherein the secured connection includes encrypted communication based at least in part on the shared secret; and
   conducting a fitting session via a secure connection between the fitting station and the hearing assistance device via the wireless communication interfaces.

2. The method of claim 1, wherein the same production key is used for a plurality of hearing assistance devices.

3. The method of claim 1, wherein the production key is generated at the manufacturer of the hearing assistance device, and wherein the production key is stored on the hearing assistance device upon manufacturing of the hearing assistance device.

4. The method of claim 1, wherein each wireless communication interface is adapted to use a Bluetooth protocol.

5. The method of claim 1, wherein after pairing, a new user key is generated by action of at least one of the fitting station and the hearing assistance device which is distributed via the secure connection to both the fitting station and the hearing assistance device, and wherein the new user key is used for generating the secure connection during the fitting session.

6. The method of claim 5, wherein the new user key is generated by the fitting station and is transmitted via the secure link to the hearing assistance device.

7. The method of claim 5, wherein the new user key is a random key and wherein the new user key is used for deriving a session key which is used for the secure connection during the fitting session.

8. The method of claim 1, wherein the new user key is stored by both the fitting station and the hearing assistance device, and wherein the fitting station and the hearing assistance device retrieve the stored new user key and use it for generating a secure connection between the fitting station and the hearing assistance device in a subsequent fitting session.

9. The method of claim 1, wherein in case that an attempt to reestablish the secure connection using the new user key fails the production key is re-used by both the fitting station and the hearing assistance device as a shared secret in order to re-pair the fitting station and the hearing assistance device.

10. A method for conducting a fitting session, the method comprising:
    generating, separately from a hearing device and a fitting station, a production key;
    distributing out-of-band the production key to both the fitting station and the hearing device;
    initiating, via the fitting station, a connection to the hearing device to establish a non-encrypted connection between the fitting station and the hearing device;
    using the production key in both the fitting station and the hearing device to pair the fitting station and the hearing device to establish a secure connection between the fitting station and the hearing device, wherein the secured connection includes encrypted communication based at least in part on a shared secret; and
    conducting a fitting session via the secure connection between the fitting station and the hearing device.

11. The method of claim 10, wherein the hearing device is at least one of following:
    a hearing aid;
    a hearing assistance device;
    behind the ear hearing device;
    in the ear hearing device;
    a completely in the canal hearing device; or
    cochlear implant.

12. The method of claim 10, wherein the production key is associated with gesture-less pairing for the hearing device.

13. The method of claim 10, the method further comprising:
    determining, by the fitting station, whether the fitting station has been previously paired with the hearing device; and
    based on determining the fitting station has not previously paired with the hearing device, automatically establishing the secure connection between the hearing device and the fitting station.

14. A non-transitory computer readable medium storing instructions that when executed by a processor cause a fitting station and a hearing device to perform operations, the operations comprising:
    generating, separately from a hearing device and a fitting station, a production key;
    distributing out-of-band the production key to both the fitting station and the hearing device, and storing the production key on both the fitting station and the hearing device;
    initiating, via the fitting station, a connection to the hearing device to establish a non-encrypted connection between the fitting station and the hearing device;
    using the production key in both the fitting station and the hearing to pair the fitting station and the hearing device to establish a secure connection between the fitting station and the hearing device wherein the secured connection includes encrypted communication based at least in part on the production key; and
    conducting a fitting session via the secure connection between the fitting station and the hearing device.

15. The non-transitory computer readable medium of claim 14, wherein the hearing device is at least one of following:
    a hearing aid;
    a hearing assistance device;
    behind the ear hearing device;
    in the ear hearing device;
    a completely in the canal hearing device; or
    cochlear implant.

16. The non-transitory computer readable medium of claim 14, wherein the production key is associated with gesture-less pairing for the hearing device.

17. The non-transitory computer readable medium of claim 14, wherein the operations further comprise:
   determining, by the fitting station, whether the fitting station has been previously paired with the hearing device; and
   based on determining the fitting station has not previously paired with the hearing device, automatically establishing the secure connection between the hearing device and the fitting station.

\* \* \* \* \*